Figure 1:
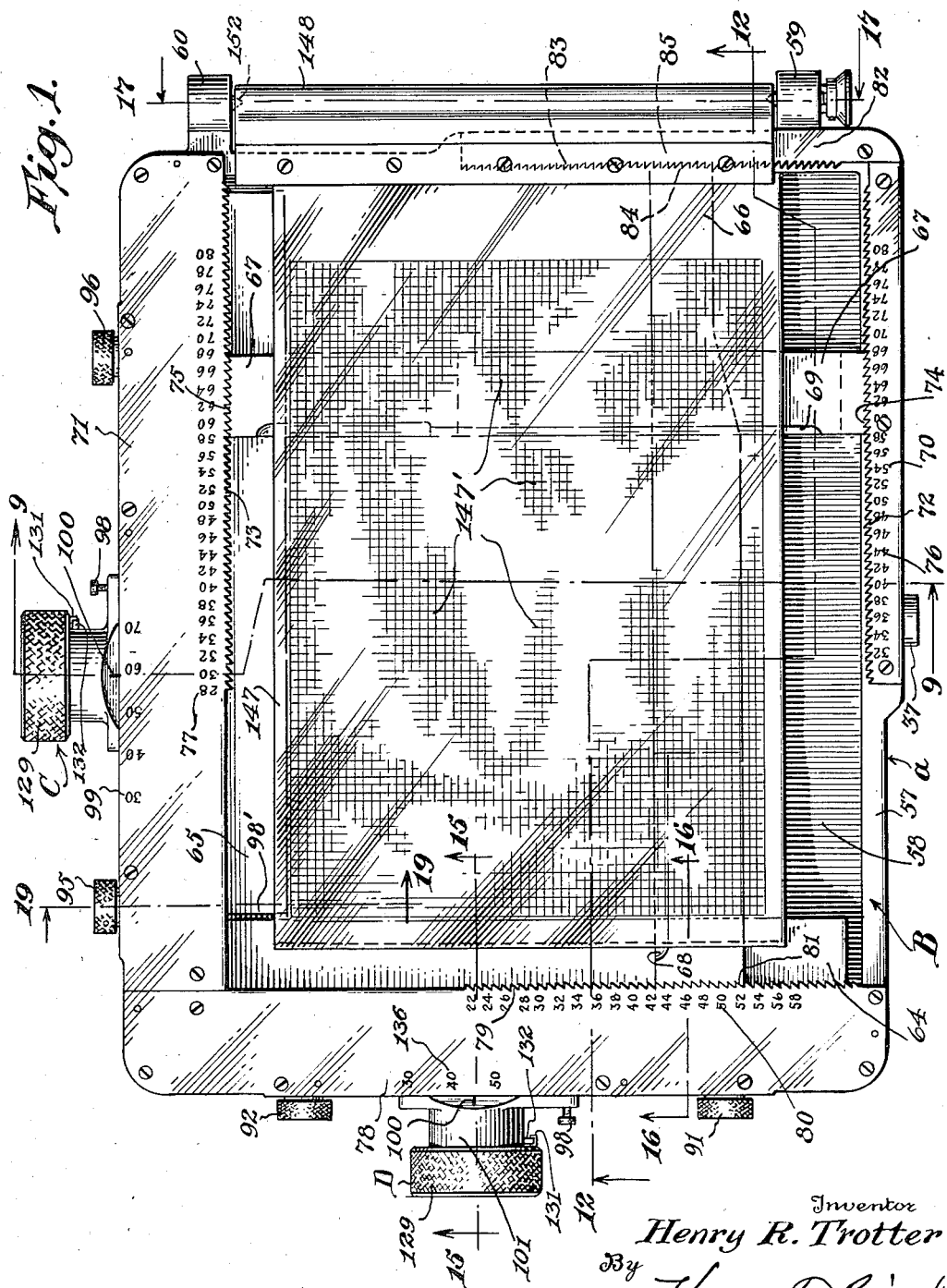

Dec. 22, 1936.  H. R. TROTTER  2,065,253

MAKE-UP GAUGE

Filed March 27, 1933  10 Sheets-Sheet 1

Inventor
Henry R. Trotter
By Henry T. Bright
Attorney

Dec. 22, 1936.　　　H. R. TROTTER　　　2,065,253
MAKE-UP GAUGE
Filed March 27, 1933　　　10 Sheets-Sheet 2

Inventor
Henry R. Trotter
By Henry T. Bright
Attorney

Dec. 22, 1936.  H. R. TROTTER  2,065,253
MAKE-UP GAUGE
Filed March 27, 1933  10 Sheets-Sheet 4

Inventor
Henry R. Trotter
By Henry T. Bright
Attorney

Dec. 22, 1936.   H. R. TROTTER   2,065,253
MAKE-UP GAUGE
Filed March 27, 1933   10 Sheets—Sheet 5

Inventor
Henry R. Trotter
By Henry P. Bright
Attorney

Dec. 22, 1936.     H. R. TROTTER     2,065,253
MAKE-UP GAUGE
Filed March 27, 1933     10 Sheets-Sheet 6
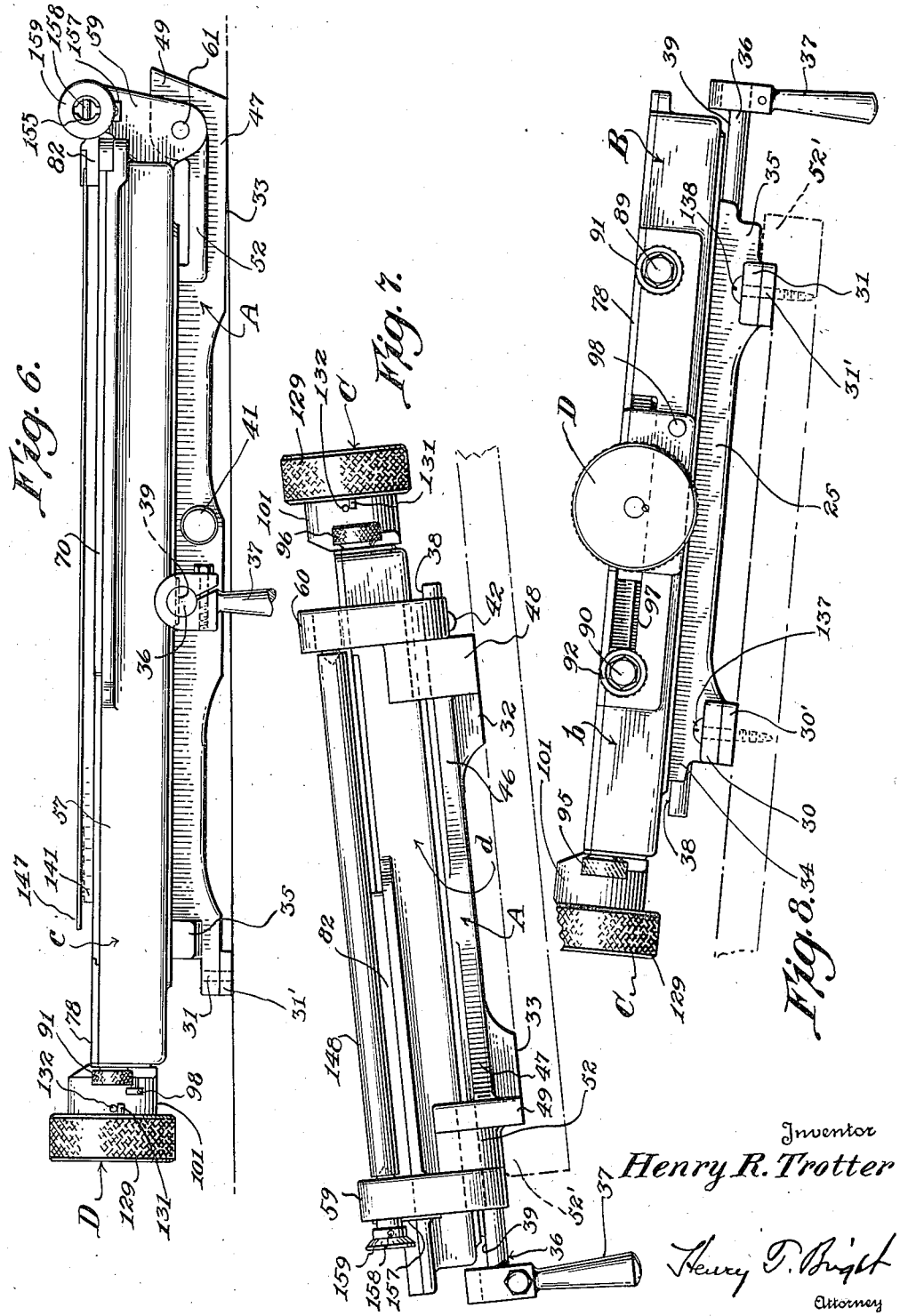
Inventor
Henry R. Trotter
Henry T. Bright
Attorney

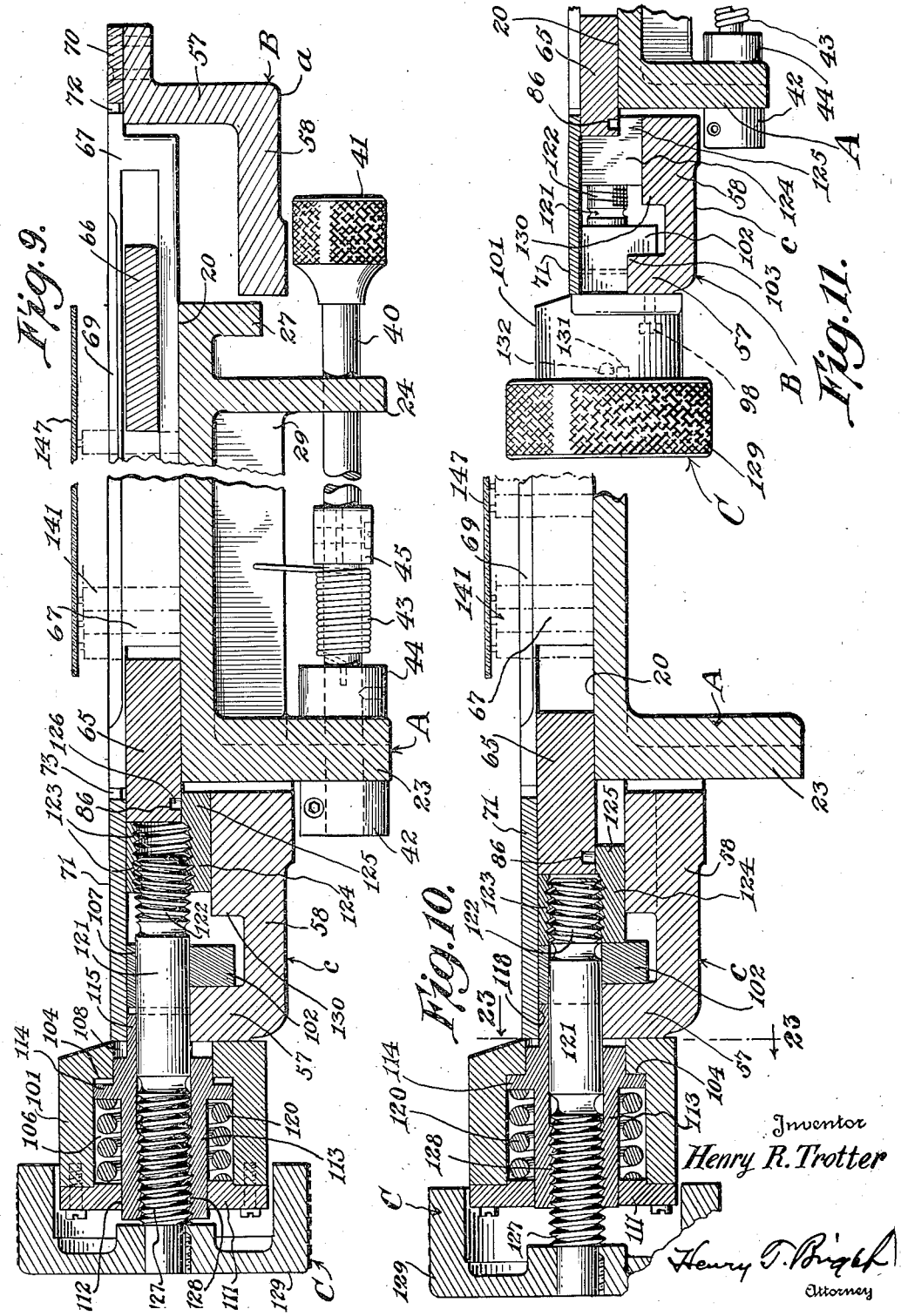

Dec. 22, 1936.  H. R. TROTTER  2,065,253
MAKE-UP GAUGE
Filed March 27, 1933  10 Sheets-Sheet 8
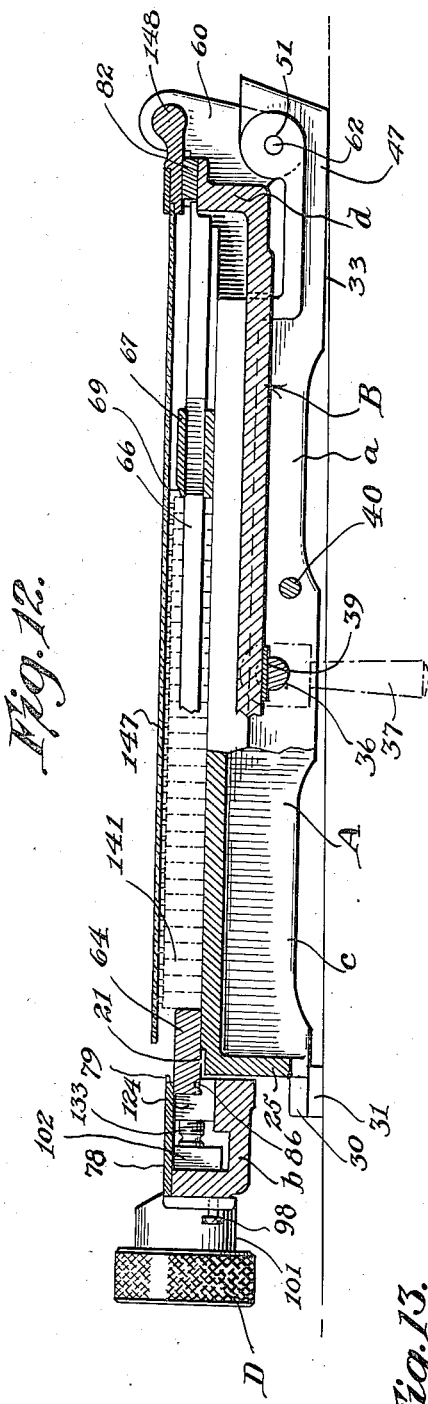
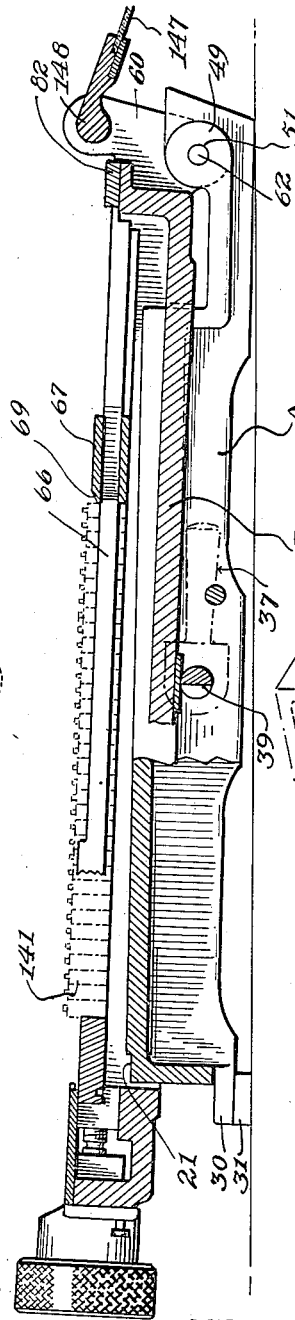
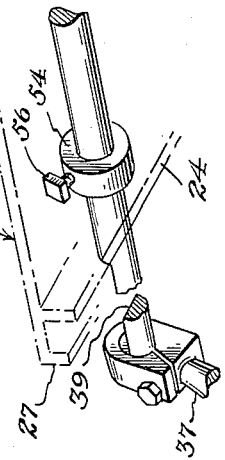
Inventor
*Henry R. Trotter*
By *Henry T. Bright*
Attorney

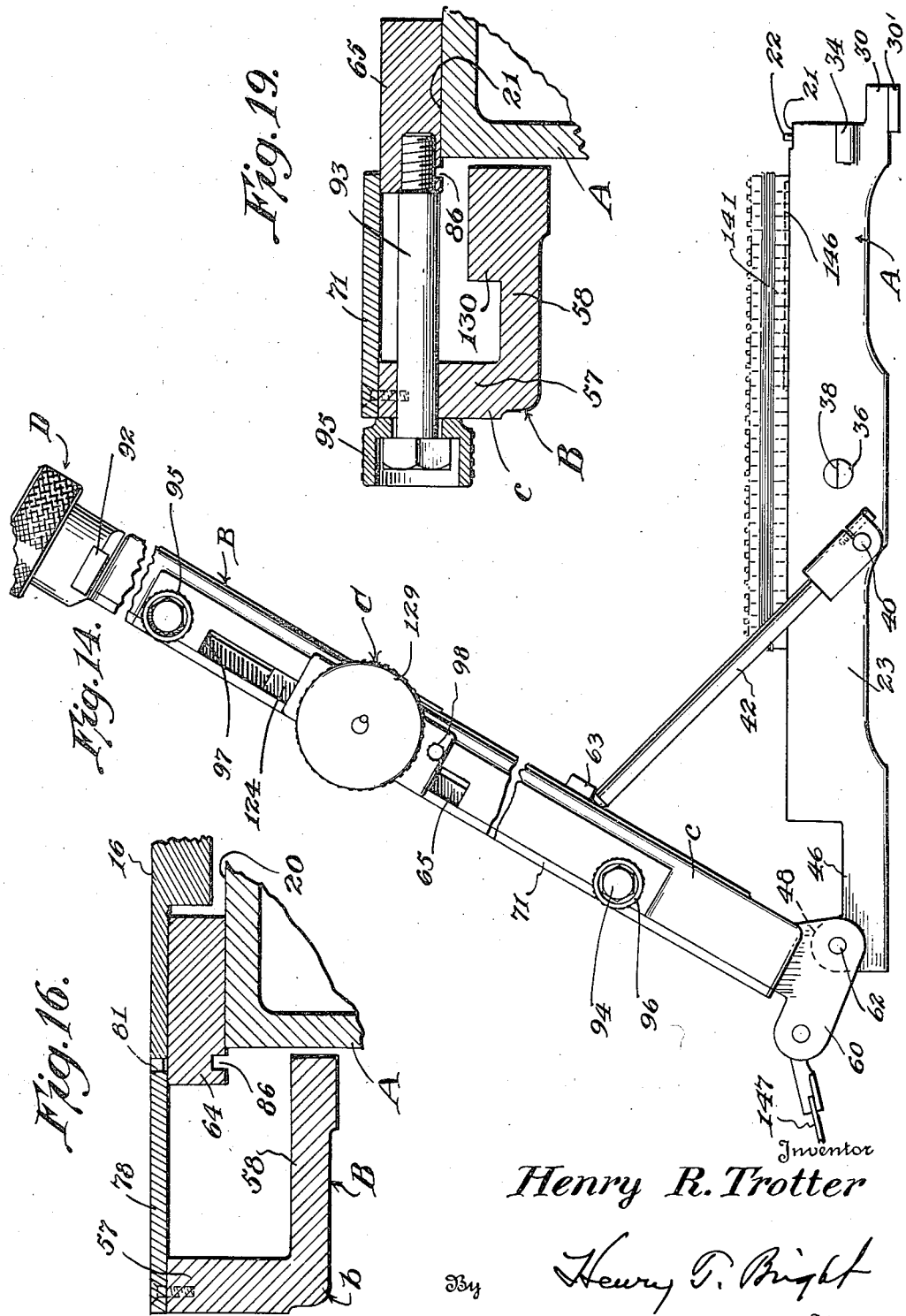

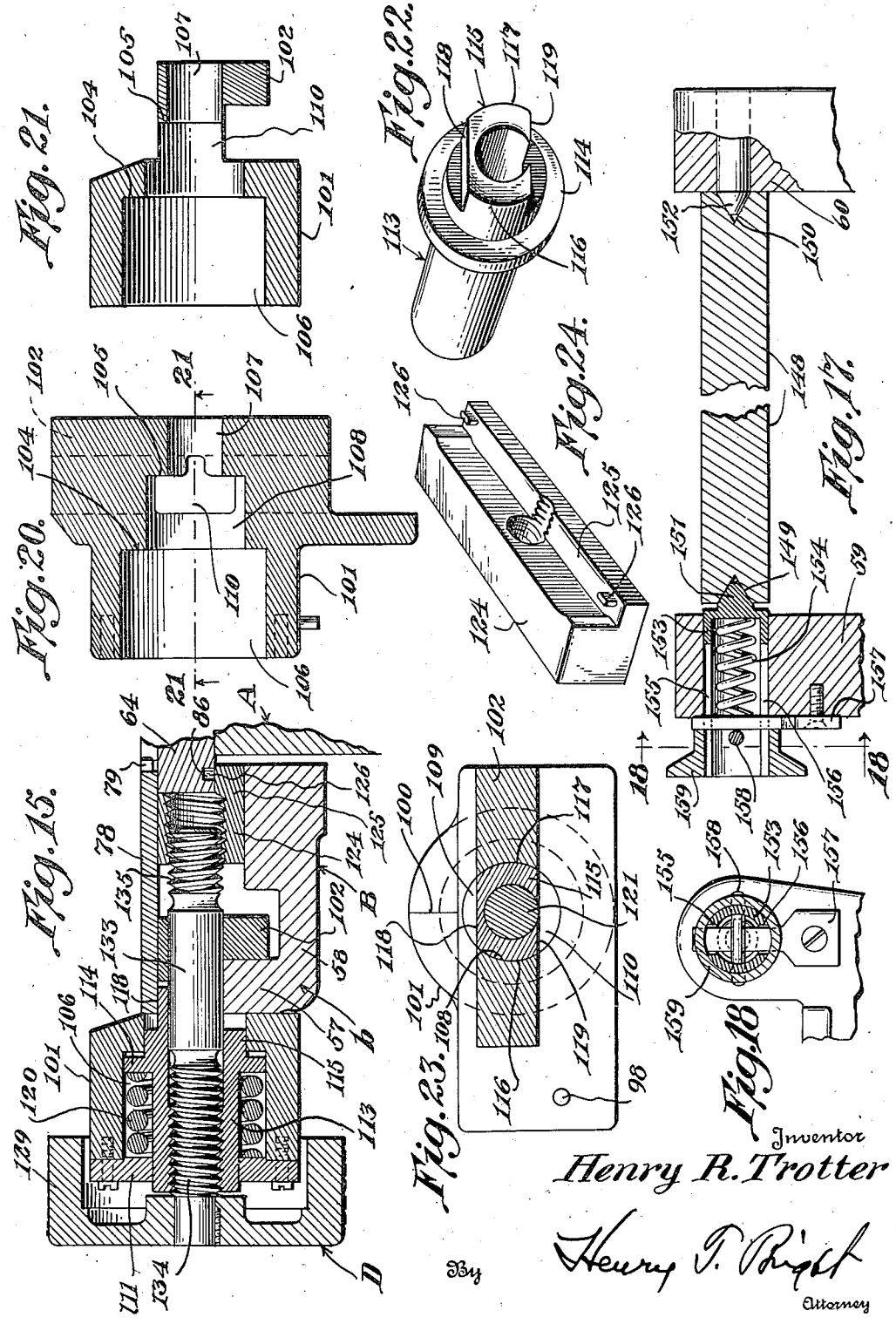

Patented Dec. 22, 1936

2,065,253

UNITED STATES PATENT OFFICE 2,065,253

MAKE-UP GAUGE

Henry R. Trotter, Chicago, Ill., assignor to Hacker Manufacturing Co., Chicago, Ill., a corporation of Illinois Application March 27, 1933, Serial No. 663,093

35 Claims. (Cl. 33—184.5)

My invention relates to a make-up gauge for use in squaring, sizing, justifying, lining and registering type page forms.

It is the purpose of my invention to provide a gauge of the type specified which will enable the compositor to make up forms with a precision hitherto unattained and thereby effect a desirable saving in subsequent labor costs and an enhancement in the standard of the work produced from forms made up in my gauge.

To this end my gauge embodies a base providing a form bed and a rigid rectangular frame hinged to the base for movement to and from imposition thereon. Within this frame I provide an adjustable form clamping frame two adjacent sides of which interengage with the rigid frame and may be positioned in such interengagement in accordance with the size of the type page form being made up, suitable scales being provided on the rigid frame whereby the location of the interengagement of said sides with the rigid frame for a given size type page form may be easily determined. The other two adjacent sides of the form clamping frame are movable into and out of clamping relation to a form by adjusting devices respectively. Each of these adjusting devices embodies mechanism controlling the pressure that can be exerted on a form so that, regardless of any human factor, the compositor can only apply a predetermined uniform pressure on an accurately justified form. With my gauge justification can be perfected and completed in the original make-up so that no subsequent justification will be necessary. When several compositors are working on a plural page job with one of my gauges individual to each compositor the accurate justification of a form by each compositor would be attained under the same uniform lock-up pressure as would exist upon the attainment of a corresponding accurate justification of a type page form by every other compositor. Each of the adjustable sides of the form clamping frame has associated therewith more than one checking device which, when operated with a form clamped under said predetermined certain pressure, provide a sensual indication upon the compositor as to the correctness or incorrectness of the overall size and squareness of the form, a like sensual indication produced upon the compositor by each checking device transmitting the information that the form is of correct size and square. In order to check the position of headings and internal line-up and squareness of forms already justified for overall size and squareness I provide a pica ruled transparent sheet which is detachably hinged to the rigid frame for imposition upon the form. When this sheet is imposed over the form it gives an instant check on crooked cuts, angled lines, bowed rules, imperfect internal alignment, etc. Of course, the use of the pica ruled transparent sheet has nothing to do with form justification proper and need be used only as the quality of the work dictates, being instantly removable from and replaceable on the rigid frame. Pages which are to be printed in two or more colors can be made up to hair line register by the use of the transparent sheet. In such an operation the key form is inked and an impression taken on the transparent sheet by rubbing the heel of the hand thereover or by the use of a suitable roller. The key form is then removed from the gauge and the color forms made up and registered to the key proof. A page form made up with my gauge is an accurate form. All forms whether made up by different compositors or on different gauges will be alike. With the accurate form units produced by my gauge the handling of the forms from then on, over the stone and to the press, is rapid and direct and free from the delays which impede the work when done in the traditional way. It also saves press shifts and press work-ups.

Figure 2:
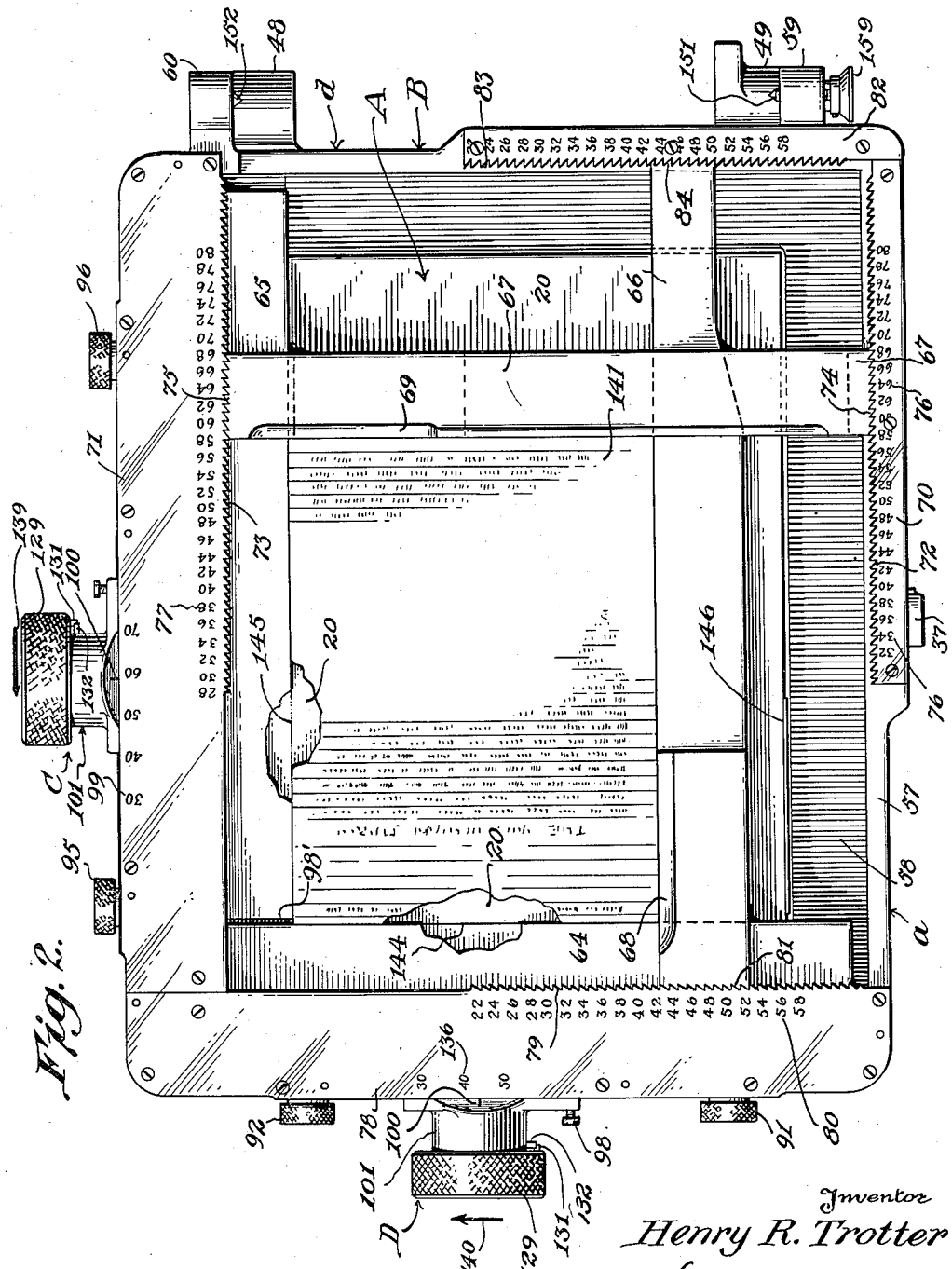
Figure 3:
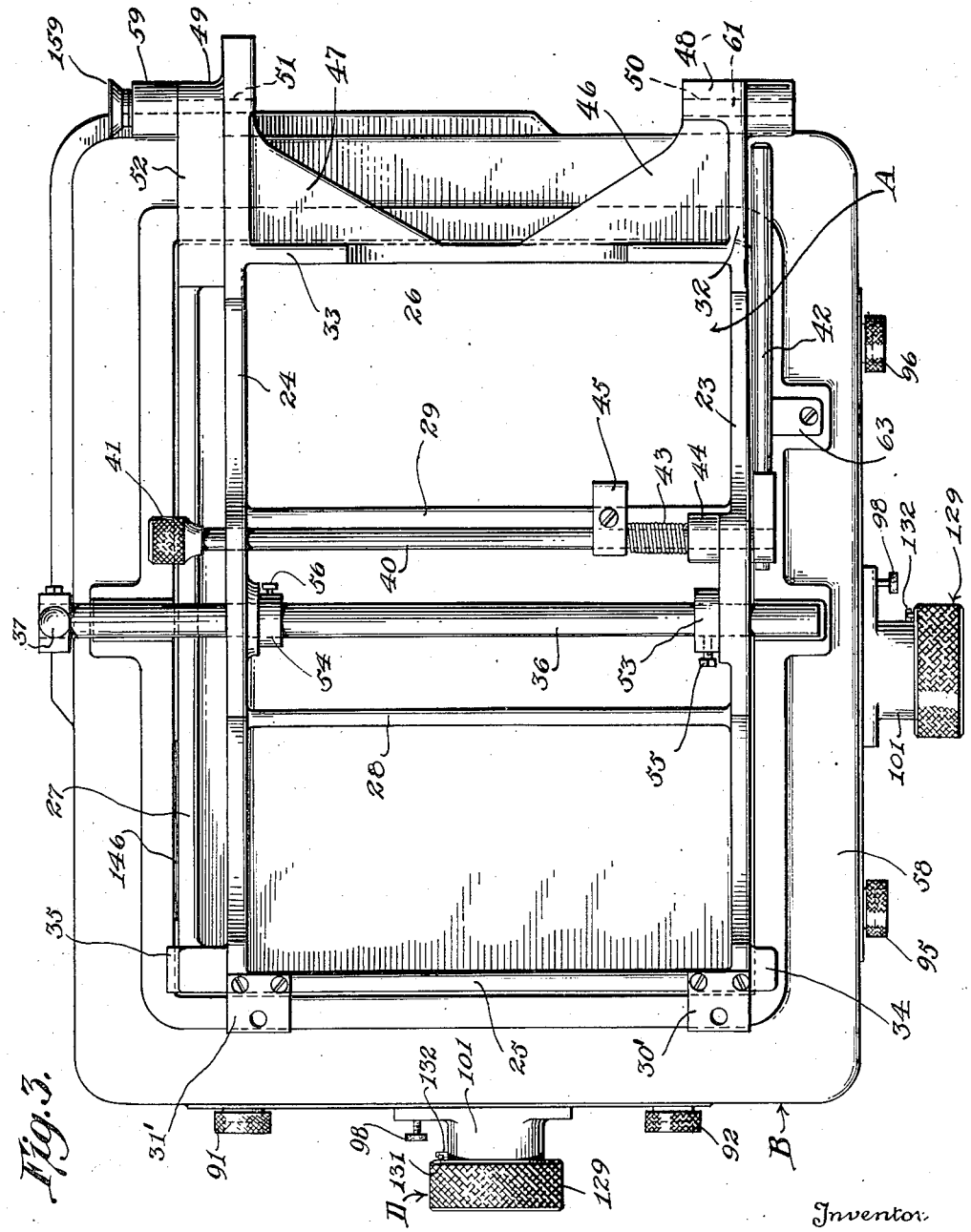
Figure 4:
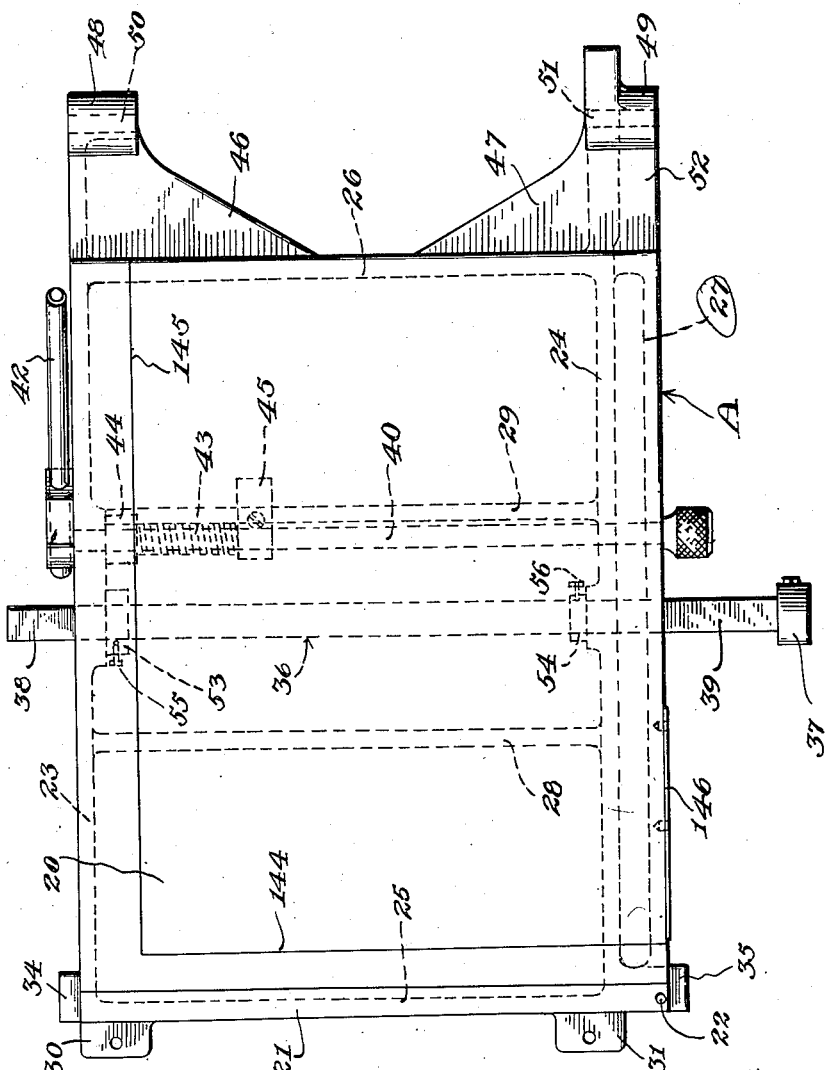
Figure 5:
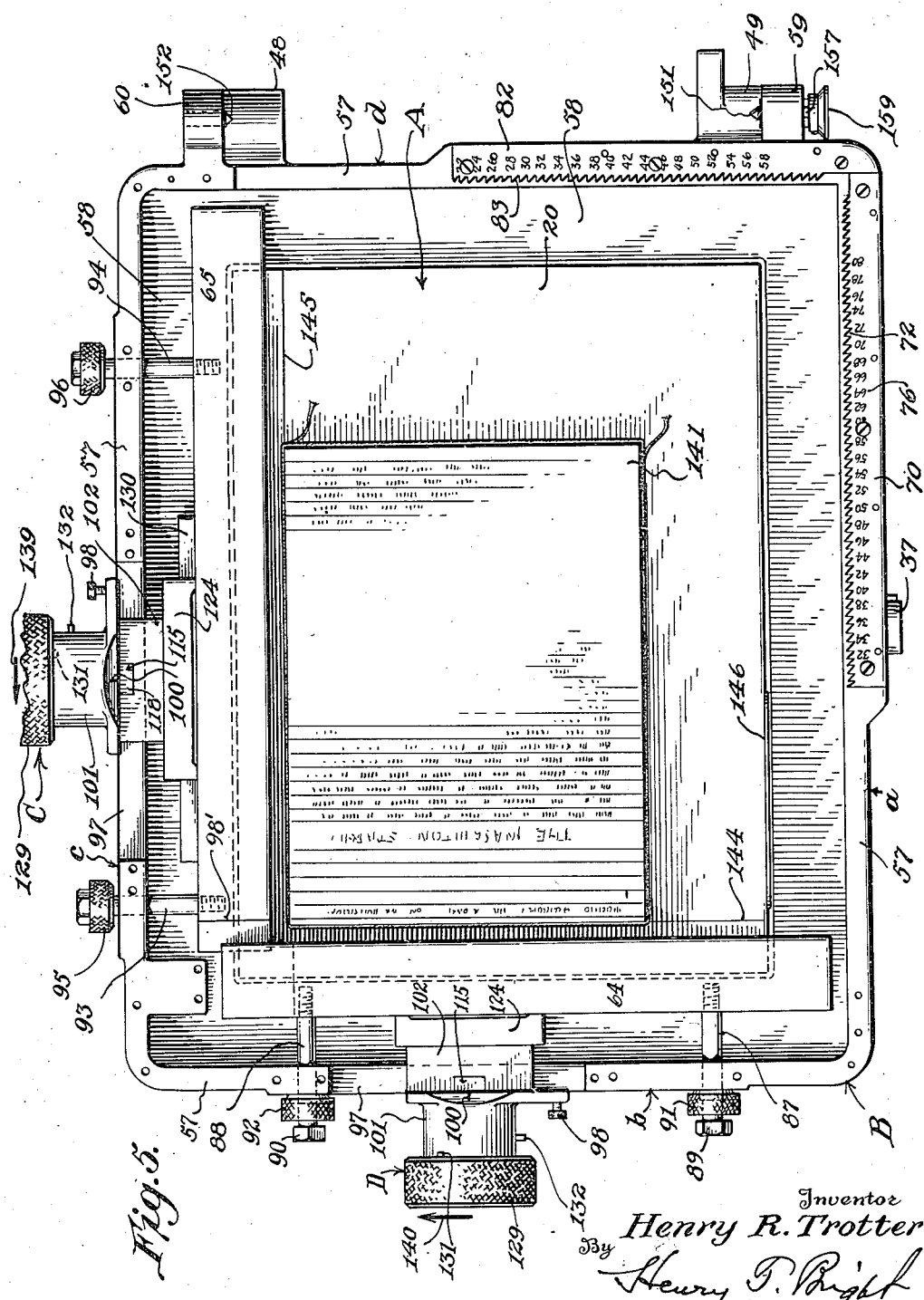

The construction and operation of my invention will be more clearly understood from the following detail description taken in connection with the accompanying drawings, in which latter Figure 1 is a plan view of my invention with a type page form therein under lock-up pressure and the transparent gauge sheet imposed upon the form;

Figure 2, a view similar to Figure 1 with certain portions broken away and the transparent gauge sheet removed;

Figure 3, a bottom view of my invention as disclosed in Figure 2;

Figure 4, a plan view of the base of my invention, the hinged form carrying frame and its associated parts being removed;

Figure 5, a view similar to Figure 1 with the transparent gauge sheet, gauge plates and two sides of the type page form clamping frame removed, the remaining two sides of the type page form clamping frame being shown fully retracted;

Figure 6, a side view of my invention as shown in Figure 1;

Figure 7, a view looking at the right hand end of Figure 6, the invention being shown disposed upon a compositor's bank;

Figure 8, a view similar to Figure 7 looking at the left hand end of Figure 6;

Figure 9, a section on the line 9—9 of Figure 1;

Figure 10, a fragment of Figure 9 showing the position occupied by the parts of the pressure producing device when no pressure is exerted thereby upon a form;

Figure 11, a detail side view of the pressure producing device shown in Figure 9;

Figure 12, a section on the line 12—12 of Figure 1;

Figure 13, a view similar to Figure 12 showing the parts in the position they would occupy when the type page form has been elevated for the purpose of testing lift;

Figure 14, a side view of my invention disclosing the type page form carrying portion elevated with respect to the base for the purpose of removing a form which has been justified;

Figure 15, a section on the line 15—15 of Figure 1;

Figure 16, a section on the line 16—16 of Figure 1;

Figure 17, a section on the line 17—17 of Figure 1;

Figure 18, a section on the line 18—18 of Figure 17;

Figure 19, an enlarged section on line 19—19 of Figure 1;

Figure 20, a longitudinal section of the casing of one of the pressure devices with the parts normally contained therein removed;

Figure 21, a section on the line 21—21 of Figure 20;

Figure 22, a perspective view of the sleeve element of one of the pressure devices;

Figure 23, a section on the line 23—23 of Figure 10;

Figure 24, a perspective view of the carrier element of one of the pressure devices; and Figure 25, a detail perspective view of the rotatable shaft employed to position the parts of my invention for lift test.

Referring particularly to the drawings my invention is shown as comprising a base A the upper face of which constitutes a type form receiving surface 20. One end of the base is stepped to form a transverse ledge 21 from the upper surface of which a pin 22 projects. The bottom of the base A is formed to provide flanges 23, 24, 25, 26 and 27. Webs 28 and 29 connect the flanges 23 and 24. It will be noted that the flanges 23, 25, 26 and 27 form a part of the outer side faces of the base A. At the junction of the flanges 25, 23 and 24 end extensions 30 and 31 are provided upon which are secured shoe plates 30' and 31' respectively. The flanges 26, 23 and 24 have their free edges shaped to provide supporting surfaces 32 and 33 which latter in conjunction with the plates 30' and 31' engage a support upon which the gauge may be disposed. Extending laterally from the base at the junctions of the flanges 23 and 24 with the flange 25 are lateral projections 34 and 35 respectively for a purpose which will presently appear. Rotatably mounted in the flanges 23 and 24 is a transverse shaft 36 on one end of which is engaged a crank or handle 37 for the purpose of effecting rotation of the shaft. Outwardly of the flanges 23 and 24 the shaft 36 is provided with flattened portions 38 and 39. Also rotatably mounted in the flanges 23 and 24 between the shaft 36 and the web 29 is a shaft 40 having fixed on one end thereof an operating knob 41. Fixed on the other end of this shaft 40 is a prop 42 for a purpose to be hereinafter referred to. The normal rotative position of the shaft 40 and of course the normal position of prop 42 is determined by a spring 43 which encircles the shaft 40 and has one end anchored to the web 29 and its other end fastened to a collar 44 fixed on the shaft 40. The rotation of the shaft 40 under the influence of the spring 43 is limited by a stop 45 fixed on said shaft and engageable with the web 29. The direction of rotation of the shaft 40 under the influence of the spring 43 is such as to automatically cause the prop 42 to move upwardly to the position shown in Figure 14. At the junctions of the flanges 23, 24 and 26 I provide extensions 46 and 47 which terminate at their free ends in enlarged portions 48 and 49 in which are provided respectively axially aligned bearing openings 50 and 51. The extension 47 includes a ledge 52 the bottom of which and the bottom of the extension 35 engage upon the usual rail 52' of a compositor's bank, as clearly shown in Figures 7 and 8.

The longitudinal position of the shaft 36 is determined by collars 53 and 54 rigidly secured to the shaft by binding screws 55 and 56 respectively, said collars being in engagement with the inner faces of the flanges 23 and 24 respectively. The radial positions of the screws 55 and 56 with respect to the shaft 36 is such that one of the screws will engage the bottom of the base A to limit rotation of the shaft in one direction while the other of said screws will engage the bottom of said base to limit rotation of the shaft in the other direction.

My gauge further comprises a rigid frame B including side portions *a*, *b*, *c* and *d*, each of which is L-shape in cross-section to provide arms 57 and 58. The side portion *d* is provided with extensions 59 and 60 which carry inwardly directed journal pins 61 and 62 respectively, the former of which is rotatably engaged in the opening 51 and the latter rotatably engaged in the opening 50. By this construction a hinged connection is provided between the base A and frame B whereby the latter may be swung to and from the positions shown in Figures 6, 13, and 14. As the frame B is swung from the position shown in Figure 6 to the position shown in Figure 14 the prop 42 will automatically move upwardly and engage beneath a stop 63 carried by the frame B to support the frame elevated and leave the compositor free to remove a justified type page form resting upon the surface 20 of the base. When the frame B is disposed in the position shown in Figure 6 the free end thereof is engaged upon the lateral extensions 34 and 35 with the free edges of the arms 58 of the sides of the frame disposed in relatively close embracing relation to the base. When the frame B is supported upon the extensions 34 and 35 the arms 58 of its sides are positioned a considerable distance below the type form receiving surface 20 of the base A as clearly shown in Figures 9 and 10.

My invention further embodies an adjustable type page form clamping frame carried by the frame B. This clamping frame includes two adjacent side members 64 and 65 through which clamping pressure is transmitted to a type page form and adjacent side members 66 and 67 from which the pressure applied to a type page form through the sides 64 and 65 reacts. Each of the sides 66 and 67 have separable interfitting connection with parts rigidly secured to the frame B whereby they may be associated with said frame in different relative positions to the latter according to the required size of the type page form to be justified. In order that the sides 66 and 67 can be moved longitudinally of the other they are interleaved as shown in Figure 9. Likewise, I render possible a similar relative movement between the sides 64 and 65 by slidably interfitting the adjacent ends thereof as shown in Figures 9, 12, and 13. The inner edges of the sides 66 and 67 are beveled as at 68 and 69 respectively for a purpose that will presently appear. Fixedly mounted on the free edges of the arms 57 of the frame sides $a$ and $c$ are gauge plates 70 and 71 respectively. The inner edges of these plates are provided with teeth 72 and 73 respectively, the sets of teeth being similar to one another and in opposed alignment tooth for tooth. The teeth 72 are adapted to interfit with corresponding teeth 74 on one end of the side 67 and the teeth 73 with corresponding teeth 75 on the other end of said side. The plate 70 is provided with a numerical scale 76, while the plate 71 is provided with a similar scale 77, the numbers of each scale being disposed opposite every second tooth. The teeth 72 and 73 are precisely formed for pica measurement so that when the side 67 is engaged with said teeth with its inner edge aligned with corresponding sides of teeth 72 and 73 opposite the scale numerals fifty-eight, said side is properly positioned for operation upon a type page form having a length of fifty-eight picas. It will thus be apparent that the operative position of the side 67 can be changed in accordance with the particular pica length of the type page form to be squared, sized and justified. Similar conditions prevail in respect to the side 66. A plate 78 is mounted on the upper edges of the arms 57 of the frame sides $a$, $b$ and $c$. The inner edge of this plate is provided with teeth 79 and in proper relation to these teeth the plate carries a scale 80. Teeth 81 on the related end of the side 66 cooperate with the teeth 79. Likewise, a plate 82 is mounted on the arm 57 of the frame side $d$ and the inner edge of this plate is provided with teeth 83 for cooperation with teeth 84 on the related end of the side 66. A numerical pica scale 85 is carried by the plate 82 in proper relation to the teeth 83. It will be apparent that the operative position of the side 66 can be readily changed in accordance with the particular pica width of the type page form to be operated upon. In Figure 2 the side 66 is shown interengaged with the plates 78 and 82 for a type form page of forty-two picas length. It will of course be understood that the construction of the parts previously described is characterized by precision and accuracy and that the sides 66 and 67, when their teeth are properly interengaged with the teeth of their related plates, are disposed in precise right angular relation and constitute a fixed abutment for two adjacent sides of a type form page, when the latter is subjected to lock-up pressure.

The sides 64 and 65 of the adjustable form clamping frame are each slidably disposed upon the surface 20 of the base A and, as heretofore pointed out, have their adjacent ends slidably interfitted to permit the requisite relative adjustment of the sides as lock-up pressure is applied to and released from a type form page. Each of the sides 64 and 65 have their bottoms provided with a longitudinal groove 86 for a purpose to be later set forth. Threaded in the outer edge of the side 64 are bolts 87 and 88 which are slidably engaged through the arm 57 of the frame side $b$. These bolts have headed outer ends 89 and 90 respectively, said headed ends being disposed outwardly of the frame B. Rotatably mounted on the bolts 87 and 88 and extending between the heads 89 and 90 and the outer face of the arm 57 of frame side $b$ are sleeves 91 and 92 respectively. The bolts 87, 88 and sleeves 91 and 92 positively limit the inward or form clamping movement of the side 64 as will be apparent and in addition the sleeves 91 and 92 serve the important function of sensually indicating to a compositor the longitudinal disposition of the side 64 according to the degree of frictional resistance to manual rotation of the sleeves 91 and 92. A similar construction is associated with the side 65 and embodies bolts 93 and 94 having sleeves 95 and 96 rotatably mounted thereon respectively, each sleeve extending between the related bolt head and the outer face of the arm 57 of the frame side $c$, whereby it will be frictionally engaged with the outer face of the arm 57 and the head of its carrying bolt. The sleeves 95 and 96 perform the same function with respect to the side 65 as do the sleeves 91 and 92 with respect to the side 64.

The arm 57 of the frame side $c$ is provided with a recess 97 and adjustably interengaged with said arm for movement within the limits of said recess is a pressure producing device C. A set screw 98 carried by the device C is engageable with the arm 57 to lock the device in a desired relation to the adjustable form clamping frame side 65, such desirable relation requiring that the device C be disposed approximately central of the length of the side 65 which is located between the inner edge of the side 67 and a shoulder 98' formed at one end of the side 65 by the formation which slidably interfits with the side 64. To easily determine the proper position of the device C for any given size type form page I provide a numercial pica scale 99 on the plate 71 and an index 100 on the device for cooperation with the scale, said index being in the form of a line located in a vertical plane passing through the axis of the device.

The pressure applying device C comprises a tubular portion including a cylindrical section 101 and a block formation 102 projecting from the end of the section 101 which is nearest the side 65. The formation 102 is provided on its under side with a channel 103 which receives the arm 57 of the frame side $c$ and thereby provides a slidable interfitting connection between the device C and the side $c$ of frame B. The bore of the tubular portion of the device C is cylindrical throughout but is contracted at spaced points, which contractions form shoulders 104 and 105. The largest and smallest portions of the bore are at the ends of the latter respectively, the former being located entirely within the longitudinal limits of the cylindrical section 101 and the latter entirely within the longitudinal limits of the block projection 102, said bore portions being indicated at 106 and 107 respectively. The bore portion between said portions 106 and 107 is indicated at 108 and is of course of less diameter than the portion 106 but of greater diameter than the portion 107. The machining in the shaping of the block projection 102 is such that the bore portion 108 is intersected at 109 and 110. The cylindrical section 101 has the end thereof remote from the block formation 102 closed by a head 111, said head having an opening 112 therein disposed in axial alignment with the bore of the tubular portion of the device C. Slidably mounted in the bore portions 106 and 108 is a sleeve 113 having bearing with the wall of the opening 112 and also having a circumscribing flange 114 in sliding engagement with the wall of the bore portion 106. The end of the sleeve 113 adjacent the block portion 102 is provided with an extension 115, which includes opposite arcuate faces 116 and 117 in bearing engagement with the wall of the bore portion 108 and with opposite flat faces 118 and 119 disposed in the planes of related faces of the block portion 102 respectively so that when said sleeve 113 is moved to its limit in the direction of the block portion 102 the faces 118 and 119 will constitute in effect continuations of related faces of said block portion. A spring 120 encircles the sleeve 113 and has one end bearing against the head 111 and its other end against the flange 114, said spring constantly tending to force the sleeve 113 in a direction to engage the flange 114 with the shoulder 104. Extending through the bore of the sleeve 113 and the bore portion 107 of the block 102 is a rotatable member 121. The end of the member 121 adjacent the side 65 is provided with left hand threads 122 in operative engagement with corresponding threads formed in the wall of a passage 123 in a carrier member 124. This carrier member has a flange or extension 125 located beneath the passage 123. Carried by and extending upwardly from the flange 125 are spaced lugs 126 which are snugly and slidably engaged in the groove 86 of the form clamping frame side 65 and provides the operative connection between said side and the pressure producing device C, said connection permitting the adjustment of the device C longitudinally of the side 65 heretofore referred to in connection with the scale 99. The connection between the threads 122 and the threads of the passage 123 is somewhat loose so that the side 65 and the carrier 124 are capable of limited pivotal movement to thus permit the side 65 to adapt itself to errors in the squareness of the type page form being squared, sized and justified when lock-up pressure is applied, it being apparent that such errors will be reflected in the frictional resistance to the rotation of the sleeves 95 and 96 and thus the operator will be informed as to the existence of error and to the location thereof in the form so that he will be in a position to justify without guessing and with great facility and rapidity. The member 121 is also provided with a length of right hand threads 127 which are engaged with corresponding threads 128 in the wall of the bore of the sleeve 113. On the end of the member 121 adjacent the cylindrical section 101 I fix an operating knob 129 for the purpose of effecting rotation of the member in either direction. This knob is cup shaped and positioned so that the head 111 and cylindrical section 101 can move into and out of the knob as the member 121 is advanced or retracted by rotation of the knob due to its threaded connection with the sleeve 113. It will be noted that the carrier 124 is slidably supported upon a boss or ledge 130 rising from the arm 58 of the frame side c. The advancing movement of the member 121 is limited by coacting stops 131 and 132 located respectively on the knob 129 and the cylindrical section 101, while the retracting movement of said member is limited by engagement of the carrier 124 with the adjacent face of the block portion 102.

Likewise, a similar pressure producing device D is associated with the form clamping frame side 64. A section of this device is shown in Figure 15 and it will noted that its member 133 which corresponds to the member 121 of device C has its thread arrangement reversed, that is to say, the right hand threads and left hand threads of device C are respectively left hand threads 134 and right hand threads 135 in device D. In other respects the two pressure producing devices are identical and corresponding parts in said devices are indicated by the same reference characters as are likewise the related parts of the frame B. I resort to this difference of thread arrangement between the two devices to render corresponding and simultaneous operation of the devices more natural for the compositor. A pica scale 136 is provided on the plate 78 for cooperation with the index 100 of the device D to determine the proper position of the device along the side 64 for a given size of type page form to be sized, squared and justified.

Assume my invention is employed by a compositor in lieu of the usual galley. Under such a condition the base A may be positively secured to the compositor's bank by a screw 137 passing through openings in the extension 30 and plate 30' and a screw 138 passing through openings in extension 31 and plate 31' as clearly shown in Figure 8. With the frame B imposed upon the base A the form clamping frame sides 66 and 67 are adjusted to the size of the type page form to be made up and the sides 64 and 65 of said frame retracted a sufficient distance not to interfere with the compositor in building the make-up. Desired tests can be made from time to time of parts of the make-up by moving either of the sides 64 and 65 inwardly according to the disposition of the make-up in the frame. When the make-up has been entirely assembled the compositor simultaneously rolls his hands over the knob C in the direction of the arrow 139 and the knob D in the direction of the arrow 140 until the sides 64 and 65 contact corresponding sides of the type page form, the latter being shown at 141 in Figures 2, 5, 6, 12, and 13. The compositor then grips the knobs C and D and continues to rotate them in the direction of the arrows 139 and 140 respectively until the stops 131 and 132 of each pressure producing device abut and prevent further rotation of uniform knobs when the lock-up pressure will be applied to the sides 64 and 65. This pressure is released by rotation of the knobs 129 of devices C and D in directions opposite to that indicated by the arrows 139 and 140. Regardless of how many times the lock-up pressure is applied in effecting the sizing, squaring, and justification of a type page form it will be the same in each instance for reasons that will be more clearly understood when the operations of the pressure producing devices C and D are hereinafter described. After the lock-up pressure is applied to the type page form the compositor can easily test its status for overall size and squareness by rotating the sleeves 91, 92, 95 and 96 to determine their frictional status. For instance, with lock-up pressure applied the sleeves 95 and 96 are rotated and it is found that the sleeve 95 is too tight to rotate with ordinary effort and the sleeve 96 so loose as to shift and rattle during rotation then it is indicated that the form is too narrow in the region of the bolt 93 and too wide in the region of the bolt 94. The form is then widened and narrowed to compensate for the indicated errors and the device C is again operated to exert lock-up pressure on the form and the frictional status of the sleeves 95 and 96 again tested. Similar operations are resorted to in respect to device D, side 64 and sleeves 91 and 92. Tests of all four sleeves or feelers are resorted to each time lock-up pressure is applied by the devices C and D. When the type page form has been justified to a condition where, when lock-up pressure is applied, the sleeves 91, 92, 95 and 96 all turn freely and without rattle on their related bolts then the type form page is square and the right size and is under uniform lock-up pressure. Recapitulating, it will be apparent that when all four feelers are clamped tight between the heads of their related bolts and the related faces of the frame B there is no pressure on the type page form, it all being on the feeler bolts. When the feelers are loose the full pressure is on the form but the form is oversize. When one feeler is looser than another then the form is not square. When the type form page is justified so that all of the feelers turn freely and without rattle on their related bolt heads then the result sought has been attained and the form is of correct size and squareness and under uniform lock-up pressure. When this correct over-all size and squareness of the locked-up form has been indicated by the feelers 91, 92, 95 and 96 the edges of the form adjacent respective frame sides 64 and 65 and the form abutting edges of said sides will always register respectively with guide lines 144 and 145 provided on the base as shown in Figure 2. The form is then tested for lift by rotating the shaft 36, through the medium of the handle 37, from the position shown in Figure 12 to the position shown in Figure 13. This rotation of the shaft 36, by reason of the coaction between the frame B and the flattened surfaces 38 and 39 of the shaft, slightly elevates the frame B and parts carried thereby and of course correspondingly elevates the type page form. When the form is thus positioned above the surface 20 the compositor presses thereon with his finger tips using special care not to overlook any lack of firmness with respect to small units such as initial letters, quads and justifying leads around cuts. When this test is completed the form is tied up. The beveled edges 68 and 69 of the sides 66 and 67 respectively permitting the necessary freedom in the operation. After the first turn or two of the tying element about the form the latter may, after release of sides 64 and 65, be pushed away from the sides 66 and 67 to permit still more freedom in the tying operation. The frame B is then elevated to the position shown in Figure 14 and supported by the prop 42. The compositor then places one end of a galley on the ledge 21 with one side thereof engaged with the pin 22 to prevent accidental lateral displacement of said galley, when the tied form can be readily slid from the surface 20 to the galley. To prevent lateral displacement of the form from the surface 20 during the aforesaid operation I mount on the side of the base a guard plate 146 projecting slightly above the surface 20.

The operation of the pressure applying device C will now be disclosed. In Figure 10 I show the device with the parts in the positions they would occupy when the form clamping frame side 65 is fully retracted with the frame side carrier 124 abutting the block 102. Upon turning the knob 129 in the direction of the arrow 139 (Figure 5) the member 121 advances to the right owing to the engagement of the threads 127 with the threads 128 of the bore of the sleeve 113. At the same time the carrier 124 and the side 65 advance in the same direction toward the form 141 but more rapidly than the member 121 owing to the fact that the threads 122 and 123 are left hand and tend to screw the carrier off of the member 121 in response to a right hand rotation of said member. When the side 65 engages the form and rotation of the knob 129 is continued pressure builds up on the form. Immediately such pressure begins to build up the sleeve 113 begins to move to the left and compresses the spring 106 so that the pressure on the form is then transmitted only by the spring through the sleeve 113, member 121, carrier 124 and frame side 65. When the knob 129 has been rotated to the limit controlled by the stops 131 and 132 the parts of the device are in the positions shown in Figure 9. It will thus be apparent that the lock-up pressure will always be exerted by the spring 106 when the latter is under a predetermined compression and therefore the same lock-up pressure will be applied to a form in every test of the latter for size, squareness and justification, which condition constitutes an important feature of my invention. Upon turning the knob 129 in the opposite direction the pressure on the form will be released and the various parts heretofore referred to will be returned to the positions shown in Figure 10. The functioning of the pressure producing device D is the same as that described in connection with device C except that the knob 129 of device D is rotated oppositely to the knob 129 of device C in applying and releasing lock-up pressure, this difference being due to the fact that the threads 134 and 135 of device D are left and right hand respectively.

If it is desired to replace large forms in the gauge the sides 64 and 65 should be fully retracted and the frame B elevated and supported by the prop 42. The galley containing the form is then placed upon the ledge 21, the form then slid upon the surface 20 of the base and placed so that the edges of the page adjacent the sides 64 and 65 are about one pica width over guide lines 144 and 145 respectively. The frame B is then lowered upon the base. Small forms can be picked up and dropped into the gauge without elevating the frame B.

My gauge further embodies a celluloid transparent sheet 147 provided with pica rulings 147′, said sheet being hinged to the frame B so that it may be imposed upon and removed from the form 141. In order to effect the hinge connection between the frame B and sheet 147 I secure one end of the latter to a hinge head 148 having provided in its ends cone shaped recesses 149 and 150 respectively, which recesses receive respectively cone shaped bearing pins 151 and 152, said bearing pins being carried by the extensions 59 and 60 respectively of the frame B. The pin 152 is fixed to the extension 60, while the pin 151 is slidable in the extension 59 and normally spring projected to operative position. In detail the pin 151 has an enlarged hollow portion 153 housing a spring 154 and having diametrically opposite longitudinal slots 155 and 156. An abutment plate 157 is secured to the outer side of the extension 59 and passes through both slots 155 and 156 and from which plate the spring 154 reacts to project the pin 151 to operative position (see Figure 17). The movement of the pin 151 under the influence of the spring 154 is limited by a strut 158 abutting the outer face of the plate 157. A tubular head 159 is engaged over the enlarged portion 153 of the pin. It is obvious that by grasping the head 159 the pin 151 can be manually retracted to permit removal of the sheet 146 from the frame B when desired.

When the sheet 146 is imposed upon the form 141 after the same is fully justified and under lock-up pressure all irregularities as to alignment and position of cuts, headings, etc. can be instantly checked by the pica rulings on the sheet.

My gauge, when the transparent sheet 147 is used in connection therewith, provides means for accurately registering color forms. When the key form has been gauged to size and squareness and the units within the form are accurately positioned by the use of the transparent sheet a key proof is then impressed upon the sheet 147 while the form is under lock-up pressure. The compositor then makes up the color form and uses the key proof on the transparent sheet to obtain accurate register.

It will be noted that all tests of the gauge, for any of its various purposes, are made with each of the sides 64 and 65 subjected to the same amount of pressure.

When I use the expression "uniform lock-up pressure" in the specification and claims I mean that the same predetermined amount of pressure is applied throughout each of two adjacent sides of the form.

In some work it is only desired to check up the dimensional errors of a form in one direction. To meet such condition my invention would be constructed with only one abutment and one presser bar for clamping the form between same and the abutment. However, such a construction is contemplated by my invention and is well within the scope and spirit of my disclosure and the appended claims.

I claim:

1. In a make-up gauge, a rigid frame, a base member, an adjustable form clamping frame for clamping a form disposed upon the base member within the rigid frame, said form clamping frame having two adjacent movable sides, devices mounted on adjacent sides of the rigid frame respectively operable to impart lock-up pressure to the movable sides in predetermined equal amounts, a plurality of headed members carried by each of said movable sides of the form clamping frame and extending loosely through openings in the corresponding side of the rigid frame, and a sleeve rotatably mounted on each member between its head and the outer edge of its related side of the rigid frame, said sleeves being adapted to frictionally engage the rigid frame and their related heads with the frictional engagement of each sleeve with the rigid frame and its related head equal to the frictional engagement of every other sleeve with its related head and the rigid frame, when said movable sides of the form carrying frame are clamped upon a form with said predetermined equal amounts of pressure, and the form is justified to correct overall size and squareness.

2. In a make-up gauge, a base, a frame hinged to the base for movement to and from imposition thereon, means for releasably clamping a form within the frame, a prop carried by the base for engaging and supporting the frame against movement toward the base when said frame has been swung away from the base to a predetermined position, and a spring means for moving the prop to frame supporting position as said frame is moved from imposition on the base to said predetermined position.

3. In a make-up gauge, a base, a frame hinged to the base for movement to and from imposition thereon, means for releasably clamping a form within the frame, a prop carried by the base for engaging and supporting the frame against movement toward the base when said frame has been swung away from the base to a predetermined position, spring means for moving the prop to frame supporting position as said frame is moved away from imposition on the base to said predetermined position, and means for limiting the movement of the prop under the influence of said spring means to its frame supporting position.

4. In a device of the character described, a base for supporting a type page form, a frame hinged to the base for movement to and from imposition thereon, means carried by the frame operable to clamp therein a form supported by the base, and means carried by the base operable to move and hold the frame to and in a position that will dispose a clamped form off the base for lift test, said means comprising a rotatable shaft having spaced cam formations cooperating with opposite sides of the frame respectively.

5. In a make-up gauge, a base member, a frame for clamping a form disposed upon the base member, said frame having two adjacent movable sides, devices respectively operable to impart clamping pressure upon said movable sides of the frame in predetermined equal amounts, and a plurality of checking devices associated with each of the aforesaid movable frame sides, each of said checking devices including relatively movable elements adapted to be brought into frictional engagement by form clamping movement of its related frame side, the correctness of the overall size and squareness of a clamped form being established when the frictional engagement between the elements of each device is of a predetermined value and corresponds to the value of the frictional engagement between the elements of every other device.

6. In a make-up gauge, a base member, a frame for surrounding a type page form disposed upon the base member, said frame including two adjacent movable sides for transmitting lock-up pressure to a form therein, a lock-up pressure producing device associated with each movable side of the frame, each of said devices including a screw member having reversely threaded portions, a block interlocked with its related frame side and threaded on one of said portions, a sleeve surrounding the screw member and threaded on the other portion, a fixed element, a spring reacting from said fixed element and compressible by longitudinal movement of the sleeve, when the screw member is rotated and resistance to the form clamping movement of the related frame side arises, a knob fixed on the screw for rotating the latter, and coacting stops to limit rotation of the knob in the direction which effects compression of the spring.

7. In a make-up gauge, a base member, a frame for surrounding a type page form disposed upon the base member, said frame including two adjacent movable sides for transmitting lock-up pressure to a form therein, a lock-up pressure producing device associated with each movable side of the frame, each of said devices including a screw member having reversely threaded portions, a block slidably interfitted with its related frame side and threaded on one of said portions, a sleeve surrounding the screw member and threaded on the other portion, a fixed element, a spring reacting from said fixed element and compressible by longitudinal movement of the sleeve, when the screw member is rotated and resistance to the form clamping movement of the related frame side arises, a knob fixed on the screw for rotating the latter, and coacting stops to limit rotation of the knob in the direction which effects compression of the spring.

8. In a device of the character described, means for supporting a type page form to be justified under lock-up pressure, means carried by the device, effective when fully operated, to produce lock-up pressure in two directions and in predetermined equal amounts with respect to each direction, means embodied in the device for indicating the justification status of a form when said pressure producing means is fully operated, and means operable to indicate any internal line-up errors in the form when the latter is accurately justified and under said predetermined lock-up pressure.

9. In a device of the character described, a frame, abutments carried by the frame against which two adjacent sides of a type page form to be justified under uniform lock-up pressure engage, floating members supported from the frame for transmitting lock-up pressure to the other two adjacent sides of a form respectively, means carried by the frame operable, when fully operated, to apply lock-up pressure to said floating members in predetermined equal amounts, and means for indicating the justification status of a form when said pressure applying means is fully operated.

10. In a device of the class described, a base for supporting a type page form, an abutment against which one side of the form engages, a presser bar for engaging the opposite side of and clamping the form, means for moving the presser bar toward and away from the form, a caged spring, and screw means operating to energize the spring when the bar encounters resistance during its form clamping movement and to simultaneously transmit the force of the spring when energized to the bar through said bar moving means.

11. In a device of the class described, a base for supporting a type page form, an abutment against which one side of the form engages, a presser bar for engaging the opposite side of and clamping the form, means for moving the presser bar toward and away from the form, a caged spring, and screw means operating to energize the spring when the bar encounters resistance during its form clamping movement and to simultaneously transmit the force of the spring to the bar through said bar moving means, and means for limiting the energization of the caged spring to a predetermined amount.

12. In a device of the class described, a base for supporting a type page form, an abutment against which one side of the form engages, a presser bar for engaging the opposite side of and clamping the form, means for moving the presser bar toward and away from the form, a caged spring, screw means operating to energize the spring when the bar encounters resistance during its form clamping movement and to simultaneously transmit the force of the spring to the bar through said bar moving means, and means for indicating dimensional errors of the form with respect to the dimension thereof which extends towards the abutment and bar when said spring has been energized.

13. In a device of the class described, a base for supporting a type page form, an abutment against which one side of the form engages, a presser bar for engaging the opposite side of and clamping the form, means for moving the presser bar toward and away from the form, a caged spring, screw means operating to energize the latter when the bar encounters resistance during its form clamping movement and to simultaneously transmit the force of the spring to the bar through said bar moving means, means for limiting the energization of the caged spring to a predetermined amount, and means for indicating dimensional errors of the form with respect to the dimension thereof which extends toward the abutment and bar when said spring has been energized to a predetermined amount.

14. In a device of the class described, a frame, a base for supporting a type page form disposed within the frame, an abutment carried by the frame against which one side of the form engages, a presser bar supported from the frame for engaging the opposite side of and clamping the form, means for moving the presser bar toward and away from the form, a caged spring, and screw means carried by the frame operating to energize the spring when the bar encounters resistance during its form clamping movement and to simultaneously transmit the force of the spring when energized to the bar through said bar moving means.

15. In a device of the class described, a frame, a base for supporting a type page form within the frame, an abutment carried by the frame and against which one side of the form engages, a presser bar supported from the frame for engaging the opposite side of and clamping the form, means for moving the presser bar toward and away from the form, a caged spring, screw means supported by the frame operating to energize the spring when the bar encounters resistance during its form clamping movement and to simultaneously transmit the force of the spring to the bar through said bar moving means, and means for limiting the energization of the caged spring to a predetermined amount.

16. In a device of the class described, a frame, a base for supporting a type page form within the frame, an abutment carried by the frame against which one side of the form engages, a presser bar supported from the frame for engaging the opposite side of and clamping the form, means for moving the presser bar toward and away from the form, a caged spring, screw means carried by the frame operating to energize the spring when the bar encounters resistance during its form clamping movement and to simultaneously transmit the force of the spring to the bar through said bar moving means, means for limiting the energization of the caged spring to a predetermined amount, and means for indicating dimensional errors of the form with respect to the dimension thereof which extends toward the abutment and bar when said spring has been energized to said predetermined amount.

17. In a device of the class described, a frame, a base for supporting a type page form within the frame, two abutments carried by the frame against which adjacent sides of the form respectively engage, two presser bars supported from the frame for engaging the other two adjacent sides of the form respectively to clamp the form, means for moving each presser bar toward and away from the form, a caged spring for each of said means, mechanism carried by the frame associated with each presser bar operating to energize the spring when its related bar encounters resistance during its form clamping movement and to simultaneously transmit the force of the spring to the bar through said bar moving means.

18. In a device of the class described, a frame, a base for supporting a type page form within the frame, two abutments carried by the frame against which adjacent sides of the form respectively engage, two presser bars supported from the frame for engaging the other two adjacent sides of the form respectively to clamp the form, means for moving each presser bar toward and away from the form, a caged spring for each of said means, mechanism carried by the frame associated with each presser bar operating to energize the spring when its related bar encounters resistance during its form clamping movement and to simultaneously transmit the force of the spring to the bar through said bar moving means, and means for limiting energization of the caged spring to a predetermined amount.

19. In a device of the class described, a frame, a base for supporting a type page form within the frame, two abutments carried by the frame against which adjacent sides of the form respectively engage, two presser bars supported from the frame for engaging the other two adjacent sides of the form respectively to clamp the form, means for moving each presser bar toward and away from the form, a caged spring for each of said means, mechanism carried by the frame associated with each presser bar operating to energize the spring when the bar encounters resistance during its form clamping movement and to simultaneously transmit the force of the spring to the bar through said bar moving means, means for limiting the energization of the caged spring to a predetermined amount, and means for indicating dimensional errors of the form when the spring of each mechanism is energized to said predetermined amount.

20. In a device of the class described, a base for supporting a type page form, an abutment against which one side of the form engages, a presser bar for engaging the opposite side of and clamping the form, means for moving the presser bar toward and away from the form, and mechanism including a caged spring and screw means between the bar and spring operable to energize the latter when the bar encounters resistance during its form clamping movement and to simultaneously transmit the force of the spring when energized to the bar through said bar moving means.

21. In a device of the class described, a base for supporting a type page form, an abutment against which one side of the form engages, a presser bar for engaging the opposite side of and clamping the form, means for moving the presser bar toward and away from the form, mechanism including a caged spring and screw means between the bar and spring operable to energize the latter when the bar encounters resistance during its form clamping movement and to simultaneously transmit the force of the spring to the bar through said bar moving means, and means for limiting the energization of the caged spring to a predetermined amount.

22. In a device of the class described, a base for supporting a type page form, an abutment against which one side of the form engages, a presser bar for engaging the opposite side of and clamping the form, means for moving the presser bar toward and away from the form, mechanism including a caged spring and screw means between the bar and spring operable to energize the latter when the bar encounters resistance during its form clamping movement and to simultaneously transmit the force of the spring to the bar through said bar moving means, means for limiting the energization of the caged spring to a predetermined amount, and means for indicating dimensional errors of the form with respect to the dimension thereof which extends toward the abutment and bar when said spring has been energized to said predetermined amount.

23. In a device of the class described, a base for supporting a type page form, two abutments against which adjacent sides of the form respectively engage, two presser bars for engaging the other two adjacent sides of the form respectively to clamp the form, means for moving each presser bar toward and away from the form, and mechanism associated with each presser bar including a caged spring and connections between the related bar and the spring operable to energize the latter when the bar encounters resistance during its form clamping movement and to simultaneously transmit the force of the spring to the bar through said bar moving means.

24. In a device of the class described, a base for supporting a type page form, two abutments against which adjacent sides of the form respectively engage, two presser bars for engaging the other two adjacent sides of the form respectively to clamp the form, means for moving each presser bar toward and away from the form, mechanism associated with each presser bar including a caged spring and connections between the related bar and spring operable to energize the latter when the bar encounters resistance during its form clamping movement and to simultaneously transmit the force of the spring to the bar through said bar moving means, and means for limiting energization of the caged spring to a predetermined amount.

25. In a device of the class described, a base for supporting a type page form, two abutments against which adjacent sides of the form respectively engage, two presser bars for engaging the other two adjacent sides of the form respectively to clamp the form, means for moving each presser bar toward and away from the form, mechanism associated with each presser bar including a caged spring and connections between the related bar and spring operable to energize the latter when the bar encounters resistance during its form clamping movement and to simultaneously transmit the force of the spring to the bar through said bar moving means, means for limiting the energization of the caged spring to a predetermined amount, and means for indicating dimensional errors of the form when the spring of each mechanism has been energized to said predetermined amount.

26. In a make-up gauge, a base member, a frame having adjustable adjacent sides for clamping a form disposed upon the base member, devices for exerting pressure on said adjustable sides respectively, each of said devices including a spring, and screw means between the spring and its related frame side operating to energize the spring, when resistance to clamping movement of said frame side arises and simultaneously transmit the force of the spring to said related frame side.

27. In a make-up gauge, a base member, a frame having adjustable adjacent sides for clamping a form disposed upon the base member, devices having interfitting connection with said adjustable sides respectively and operable to advance and retract its related side, and means for adjusting each device longitudinally of its related frame side without disconnection from said side.

28. In a make-up gauge, a base member, a frame having adjustable adjacent sides for clamping a form disposed on the base member, and devices respectively operable to advance and retract adjacent adjustable sides of the frame, each of said devices having pivotal connection with its related frame side.

29. In a device of the class described, a base for supporting a type page form, an abutment against which one side of the form engages, a presser bar for engaging the opposite side of and clamping the form, screw means effective when operated in one direction to move the presser bar in form clamping direction and from form clamping position when operated in the opposite direction.

30. In a device of the class described, an adjustable frame for surrounding a supported type page form, said frame including two adjustable adjacent sides, screw means associated with each adjustable side effective when operated in one direction to move its related adjustable frame side in form clamping direction, and from form clamping position when operated in the opposite direction.

31. In a device of the character described, means for supporting a type page form to be justified under lock-up pressure, means carried by the device, effective when fully operated, to produce lock-up pressure in two directions and only in predetermined equal amounts with respect to each direction, and means embodied in the device for indicating the justification status of a form when said pressure producing means is fully operated.

32. In a device of the class described, a base for supporting a type page form, an abutment against which one side of the form engages, a presser bar for engaging the opposite side of and clamping the form between the same and said abutment, means for moving the presser bar against and from the form, a caged spring, a fixed abutment from which said spring reacts when compressed, and mechanism operating to compress the spring against said abutment when the bar encounters resistance during its form clamping movement and to simultaneously transmit the force of the spring to the bar through said bar moving means in a direction to impart a form clamping force to said bar, and means for limiting the compression of the caged spring to a predetermined amount.

33. In a device of the class described, a base for supporting a type page form, an abutment against which one side of the form engages, a presser bar for engaging the opposite side of and clamping the form between the same and said abutment, means for moving the presser bar against and from the form, a caged spring, a fixed abutment from which said spring reacts when compressed, mechanism operating to compress the spring against said abutment when the bar encounters resistance during its form clamping movement and to simultaneously transmit the force of the spring to the bar through said bar moving means in a direction to impart a form clamping force to said bar, means for limiting the compression of the caged spring to a predetermined amount, and means controlled by form clamping movement of the presser bar for indicating dimensional errors of the form with respect to the dimension thereof which extends toward the abutment and bar when said spring has been compressed to a predetermined amount.

34. In a device of the class described, a frame, a base for supporting a type page form within the frame, an abutment carried by the frame and against which one side of the form engages, a presser bar supported from the frame for engaging the opposite side of and clamping the form, between the same and said abutment, means for moving the presser bar against and from said form, a caged spring, a fixed abutment from which said spring reacts when compressed, mechanism supported by the frame operating to compress the spring against said abutment when the bar encounters resistance during its form clamping movement and to simultaneously transmit the force of the spring to the bar through said bar moving means in a direction to impart a form clamping force to said bar, and means for limiting the compression of the caged spring to a predetermined amount.

35. In a device of the class described, a frame, a base for supporting a type page form within the frame, an abutment carried by the frame against which one side of the form engages, a presser bar supported from the frame for engaging the opposite side of and clamping the form between the same and said abutment, means for moving the presser bar against and from the form, a caged spring, a fixed abutment from which said spring reacts when compressed, mechanism carried by the frame operating to compress the spring when the bar encounters resistance during its form clamping movement and to simultaneously transmit the force of the spring to the bar through said bar moving means in a direction to impart a form clamping force to said bar, means for limiting the compression of the caged spring to a predetermined amount, and means controlled by form clamping movement of the presser bar for indicating dimensional errors of the form with respect to the dimension thereof which extends toward the abutment and bar when said spring has been compressed to said predetermined amount.

HENRY R. TROTTER.